United States Patent [19]
Moskovich

[11] Patent Number: 5,841,587
[45] Date of Patent: Nov. 24, 1998

[54] LCD PROJECTION LENS

[75] Inventor: Jacob Moskovich, Cincinnati, Ohio

[73] Assignee: U.S. Precision Lens Inc., Cincinnati, Ohio

[21] Appl. No.: 757,341

[22] Filed: Nov. 27, 1996

Related U.S. Application Data

[60] Provisional application No. 60/016,469 Apr. 29, 1996.

[51] Int. Cl.[6] ............................ G02B 13/22; G02B 13/18
[52] U.S. Cl. ........................................ 359/662; 359/663
[58] Field of Search ....................... 359/649, 663, 359/676, 651, 662, 708, 713–716, 740, 752, 753

[56] References Cited

U.S. PATENT DOCUMENTS

| | | | |
|---|---|---|---|
| 700,650 | 8/1902 | Goerz | 359/794 |
| 2,031,792 | 2/1936 | Richter | 359/737 |
| 3,947,094 | 3/1976 | Ikemori | 359/751 |
| 4,025,169 | 5/1977 | Fischer et al. | 359/751 |
| 4,046,459 | 9/1977 | Kawamura | 359/751 |
| 4,189,211 | 2/1980 | Taylor | 359/663 |
| 4,425,028 | 1/1984 | Gagnon et al. | 359/246 |
| 4,441,792 | 4/1984 | Tateoka | 359/663 |
| 4,461,542 | 7/1984 | Gagnon | 359/41 |
| 4,511,223 | 4/1985 | Hirose | 362/268 |
| 4,637,690 | 1/1987 | Miyamae et al. | 359/683 |
| 4,826,311 | 5/1989 | Ledebuhr | 353/31 |
| 4,913,540 | 4/1990 | Minefuji | 359/663 |
| 4,925,279 | 5/1990 | Shirota | 359/206 |
| 5,042,929 | 8/1991 | Tanaka et al. | 359/708 |
| 5,179,473 | 1/1993 | Yano et al. | 359/691 |
| 5,200,861 | 4/1993 | Moskovich | 359/662 |
| 5,218,480 | 6/1993 | Moskovich | 359/662 |
| 5,278,698 | 1/1994 | Iizuka et al. | 354/682 |
| 5,313,330 | 5/1994 | Belensky | 359/676 |
| 5,331,462 | 7/1994 | Yano | 354/689 |
| 5,625,495 | 4/1997 | Moskovich | 359/663 |

FOREIGN PATENT DOCUMENTS 311116 4/1989 European Pat. Off. .

*Primary Examiner*—Frank G. Font
*Assistant Examiner*—Michael P. Stafira
*Attorney, Agent, or Firm*—Maurice M. Klee

[57] ABSTRACT

A projection lens for use with LCD panels is provided. The lens has two aspherical meniscus elements which are concave to each other and are located in the vicinity of the lens' aperture stop and a color-correcting doublet which provides most of the positive optical power of the lens. The lens can also include an aspherical corrector lens element of weak optical power which is located on the side of the two meniscus elements opposite to the color correcting doublet.

17 Claims, 8 Drawing Sheets

LCD PROJECTION LENS

CROSS REFERENCE TO RELATED PROVISIONAL APPLICATION

This application claims the benefit under 35 USC §119(e) of U.S. Provisional Application No. 60/016,469, filed Apr. 29, 1996.

FIELD OF THE INVENTION

This invention relates to projection lenses and, in particular, to projection lenses which can be used, inter alia, to form an image of an object composed of pixels, such as, a liquid crystal display (LCD).

BACKGROUND OF THE INVENTION

Projection lens systems (also referred to herein as "projection systems") are used to form an image of an object on a viewing screen. The basic structure of such a system is shown in FIG. 8, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels of a LCD panel), and 13 is a projection lens, composed of multiple lens elements, which forms an enlarged image of object 14 on viewing screen 16.

Projection lens systems in which the object is a LCD or other pixelized panel are used in a variety of applications, including data display systems. Such projection lens systems preferably employ a single projection lens which forms an image of either a single panel having, for example, red, green, and blue pixels, or three individual panels, one for each color. For ease of reference, the following discussion will be in terms of a projection lens system that employs a single LCD panel, it being understood that the invention can also be used in systems which employ multiple panels and/or other types of pixelization.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, and Yano, U.S. Pat. No. 5,331,462. Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

The projection lenses of the invention comprise two strongly bent symmetrical aspherical meniscus elements which have their concave surfaces facing each other and are preferably of weak power, an aperture stop in the vicinity of the meniscus elements, e.g., between the meniscus elements, and a color correcting doublet of positive power in front of or behind these elements.

These projection lenses provide sufficient degrees of freedom to obtain a satisfactory correction of the aberrations of the lens. The aspherical meniscus elements provide most of the positive contribution to the spherical, coma and field curvature aberrations of the lens, and thereby offset the negative contributions to these aberrations arising from the strong power doublet. The color correcting doublet provides most of the power of the lens as well as a necessary correction of chromatic aberrations. Correction of astigmatism is achieved through the use of the aspherical surfaces in combination with the position of the aperture stop relative to the power group. A further improvement in the correction of distortion can be achieved by using additional aspherical elements, e.g., a corrector unit comprising one or more lens elements.

When the aspherical meniscus elements are arranged on the object side of the color correcting power doublet, the back focal length of the lens system tends to be about equal to or longer than the focal length of the system as a whole. On the other hand, when the power doublet is a leading component, the back focal length of the system tends to be quite short relative to the system's focal length, giving the system a telephoto ratio of approximately 1.

The focal length of the power doublet is always shorter than the absolute value of the focal length of each of the aspherical meniscus elements. The aspherical meniscus elements can be identical to each other. When made in plastic, the cost of these elements can be very low, and consequently, the whole lens can be manufactured economically in large quantities.

In summary, the invention in accordance with certain of its aspects provides a projection lens for forming an image of an object, wherein the lens comprises:

(a) two meniscus elements having focal lengths $f_1$ and $f_2$, wherein the meniscus elements are (i) concave to each other and (ii) located in the vicinity of the aperture stop, each meniscus element having at least one aspherical surface; and (b) a color-correcting doublet having a focal length $f_3$; where:

(i) $f_3 > 0$;

(ii) $f_3 < |f_1|$;

(iii) $f_3 < |f_2|$;

(iv) the projection lens has an object side and an image side; and (v) the two meniscus elements are on the object side of the projection lens and the color-correcting doublet is on the image side of the projection lens.

The projection lens can further comprise a corrector lens element which (i) has at least one aspherical surface, (ii) is of weak optical power, and (iii) is located on the object side of the projection lens.

In accordance with other aspects, the invention provides a projection lens for forming an image of an object, said lens having an aperture stop and consisting of:

(a) two meniscus elements having focal lengths $f_1$ and $f_2$, said meniscus elements being (i) concave to each other and (ii) located in the vicinity of the aperture stop, each meniscus element having at least one aspherical surface; and (b) a color-correcting doublet having a focal length $f_3$, where:

$f_3 > 0$;

$f_3 < |f_1|$; and $f_3 < |f_2|$.

In further aspects, the invention provides a projection lens for forming an image of an object, said lens having an aperture stop and consisting of:

(a) two meniscus elements having focal lengths $f_1$ and $f_2$, said meniscus elements being (i) concave to each other and (ii) located in the vicinity of the aperture stop, each meniscus element having at least one aspherical surface;

(b) a color-correcting doublet having a focal length $f_3$, where:

$f_3 > 0$;

$f_3 < |f_1|$;

$f_3 < |f_2|$; and (c) a corrector lens element which has at least one aspherical surface and is of weak optical power;

said color correcting doublet and said corrector lens element being on opposite sides of said two meniscus elements.

In accordance with the foregoing aspects of the invention, the projection lens can have some or all of the following properties:

(1) the meniscus elements can each have a weak optical power;
(2) the meniscus elements can be identical;
(3) each meniscus element can have two aspherical surfaces;
(4) the aperture stop can be located between the two meniscus elements; and/or
(5) the color-correcting doublet can be closely spaced to the two meniscus elements.

When a corrector lens element is used, this element can have some or all of the following properties:

(1) the corrector lens element can have two aspherical surfaces;
(2) the corrector lens element can be closely spaced to the two meniscus elements; and/or
(3) $f_1$ and $f_2$ can have the same sign, the corrector lens element can have a focal length $f_{CR}$, and the sign of $f_{CR}$ can be opposite to the sign of $f_1$ and $f_2$.

The invention also provides projection lens systems for forming an image of an object, wherein the system comprises:

(a) an illumination system comprising a light source and illumination optics which forms an image of the light source, said image of the light source being the output of the illumination system;
(b) a pixelized panel which comprises the object; and
(c) a projection lens of the type described above.

As illustrated in the examples set forth below, the lens system has a maximum speed of f/2.8 and a total angular coverage of approximately 50 degrees.

As also illustrated in the examples, the lens systems of the invention produce a magnified image of an object wherein the object, and thus the object side of the lens system, is associated with the system's short conjugate and the image, and thus the image side of the lens system, is associated with the system's long conjugate. In addition, the examples illustrate that the color correcting doublet comprises a positive crown element and a negative flint element.

The foregoing drawings, which are incorporated in and constitute part of the specification, illustrate the preferred embodiments of the invention, and together with the description, serve to explain the principles of the invention.

It is to be understood, of course, that both the drawings and the description are explanatory only and are not restrictive of the invention.

DESCRIPTION OF THE PREFERRED EMBODIMENTS

Figure 1:
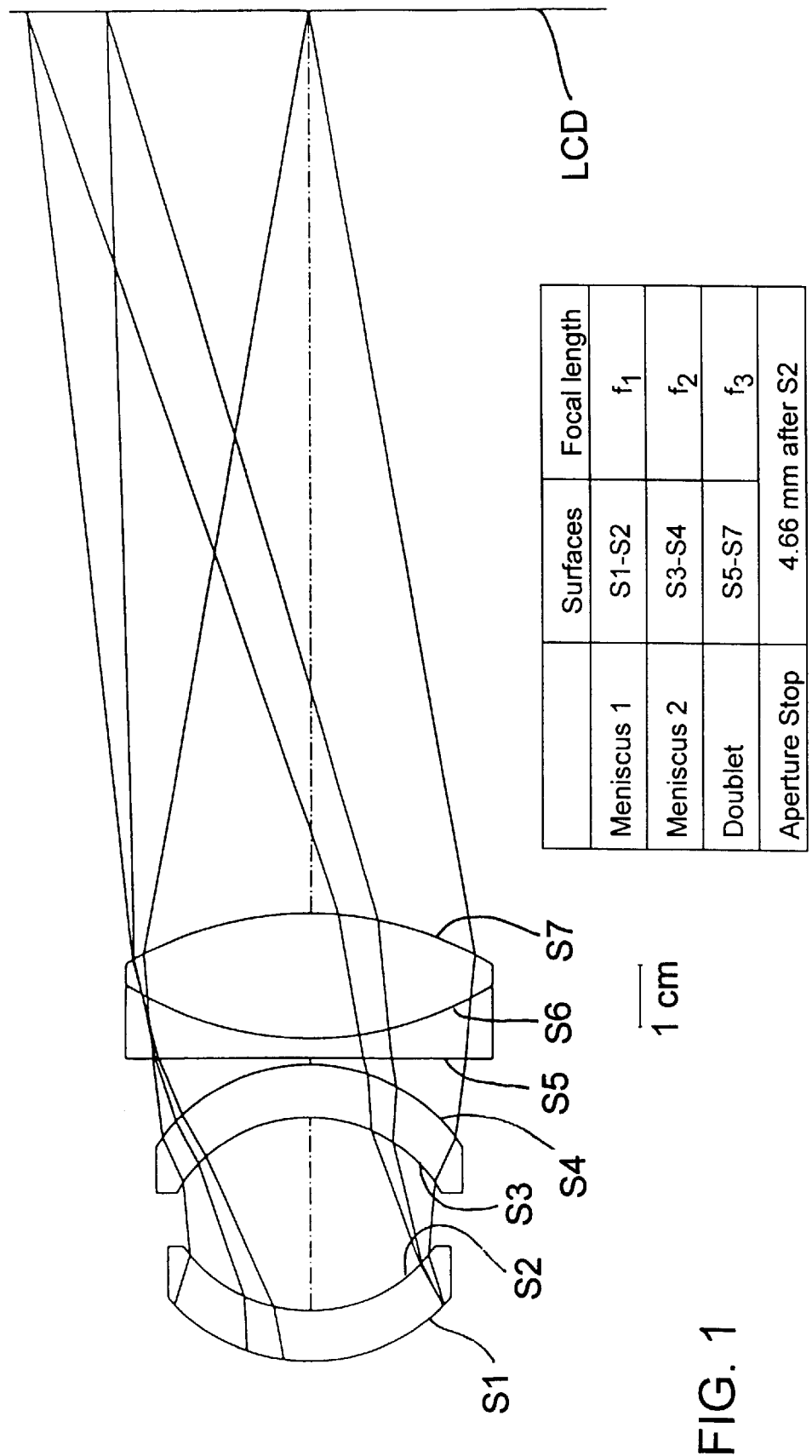
FIG. 1 is a schematic side view of a first projection lens constructed in accordance with the invention.
Figure 2:
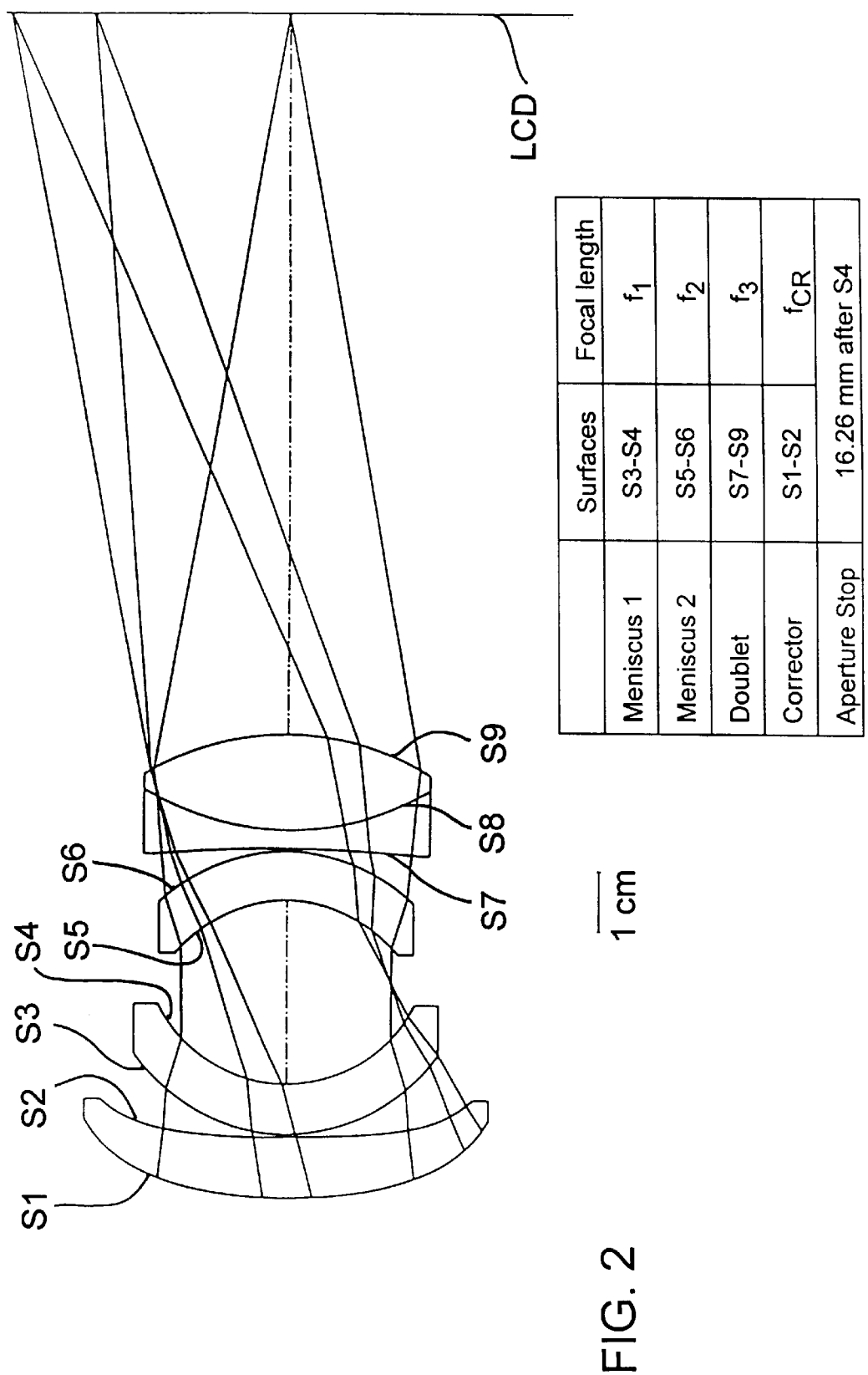
FIG. 2 is a schematic side view of a second projection lens constructed in accordance with the invention.
Figure 3:
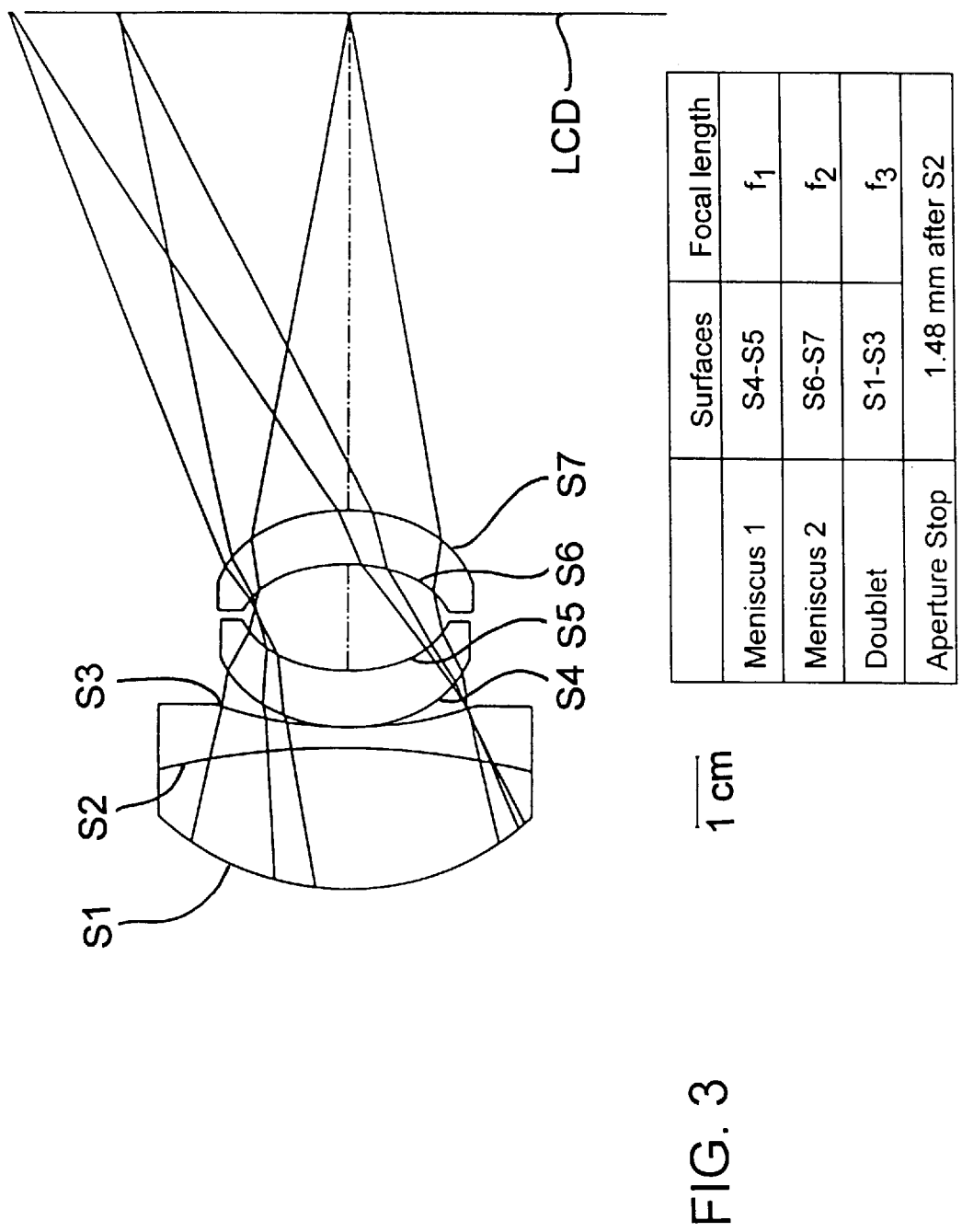
FIG. 3 is a schematic side view of a third projection lens constructed in accordance with the invention.
Figure 4:
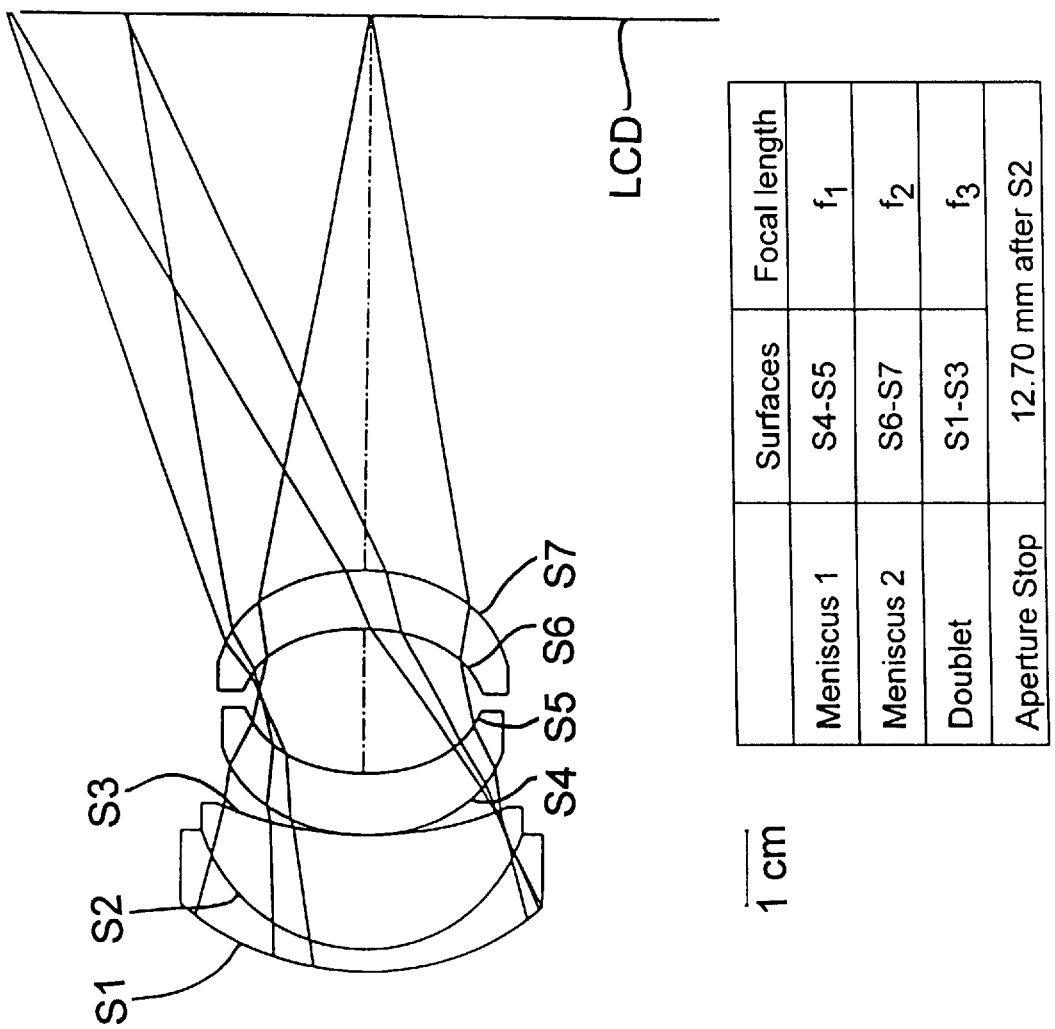
FIG. 4 is a schematic side view of a fourth projection lens constructed in accordance with the invention.
Figure 5:
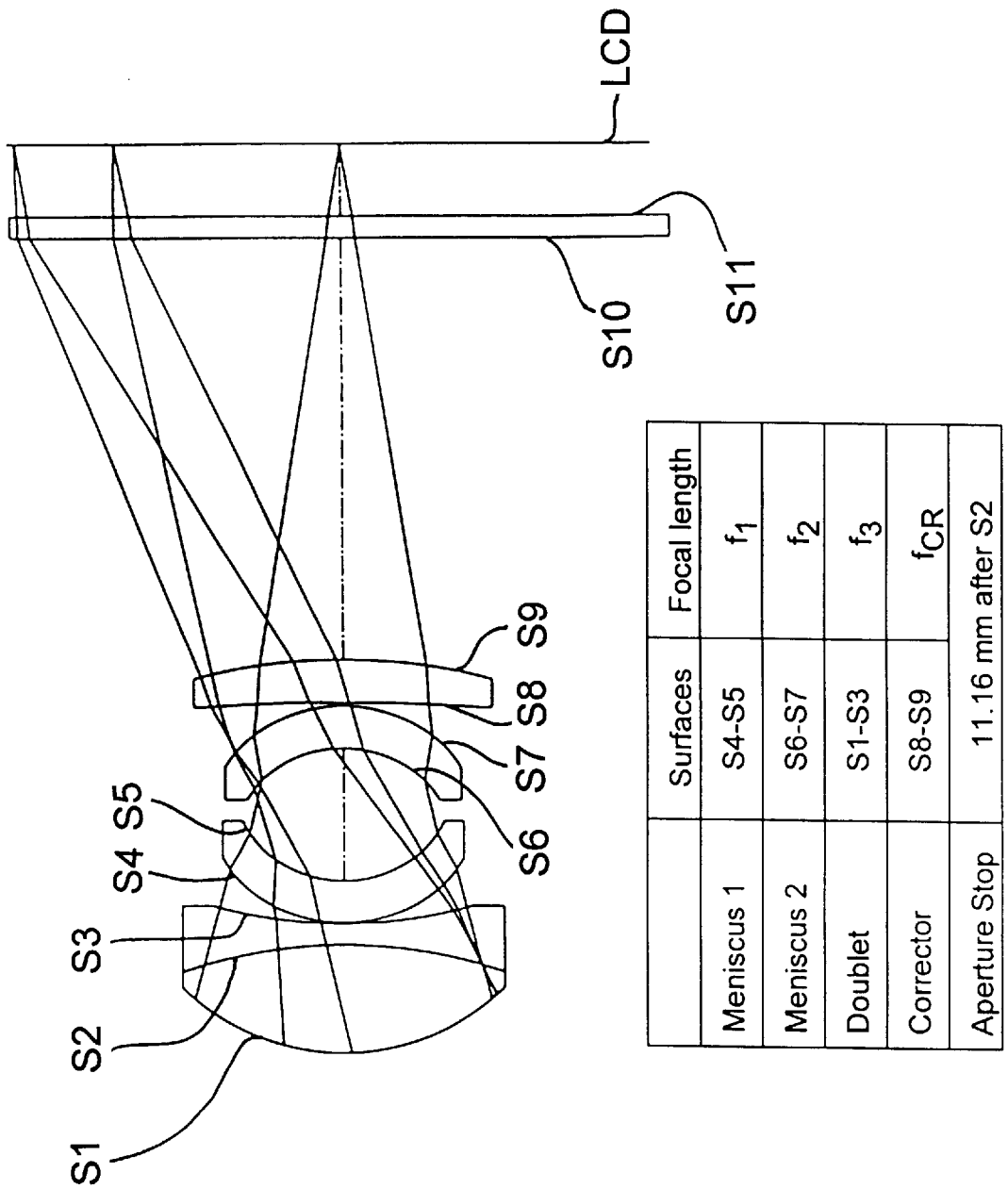
FIG. 5 is a schematic side view of a fifth projection lens constructed in accordance with the invention.
Figure 6:
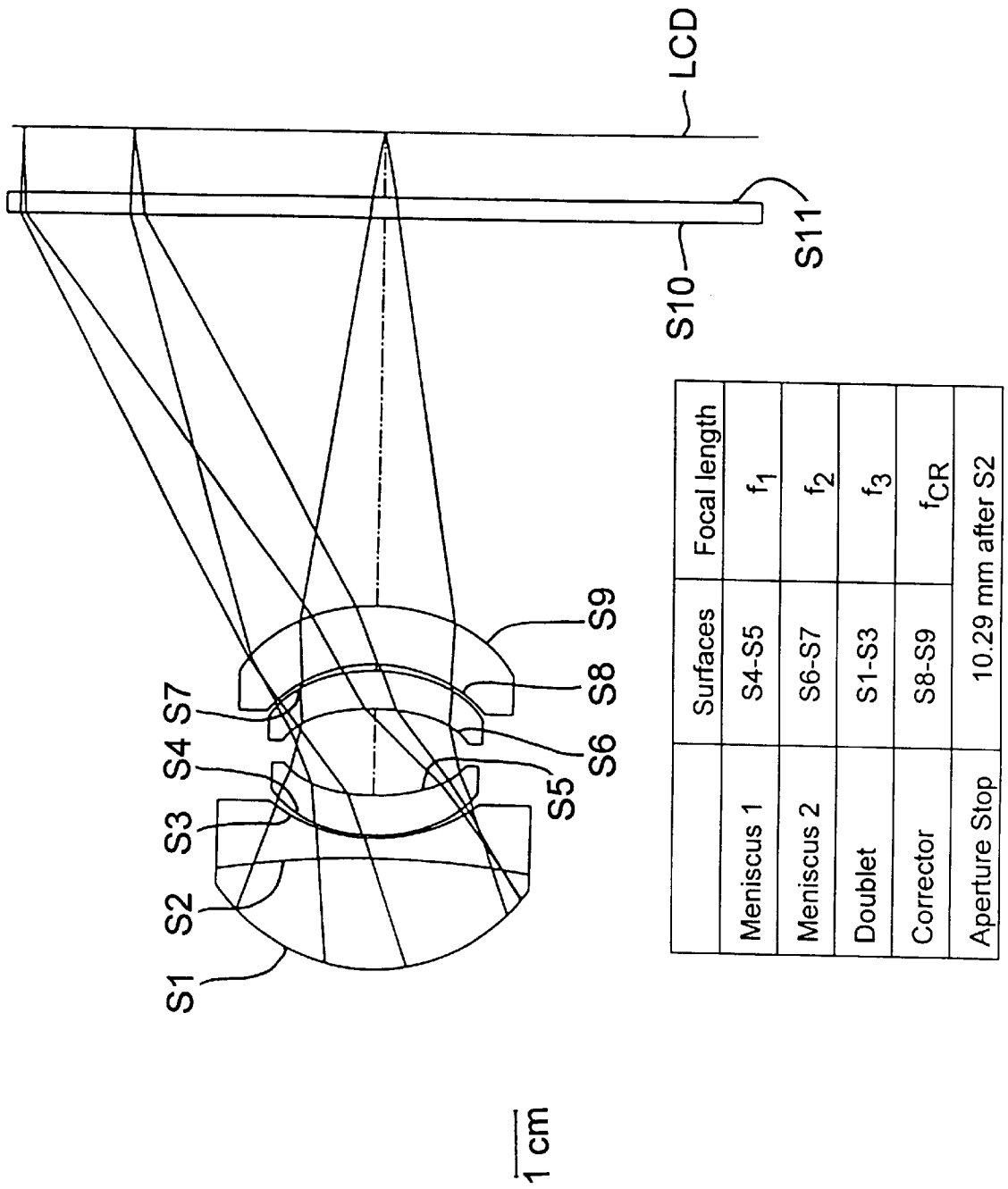
FIG. 6 is a schematic side view of a sixth projection lens constructed in accordance with the invention.
Figure 7:
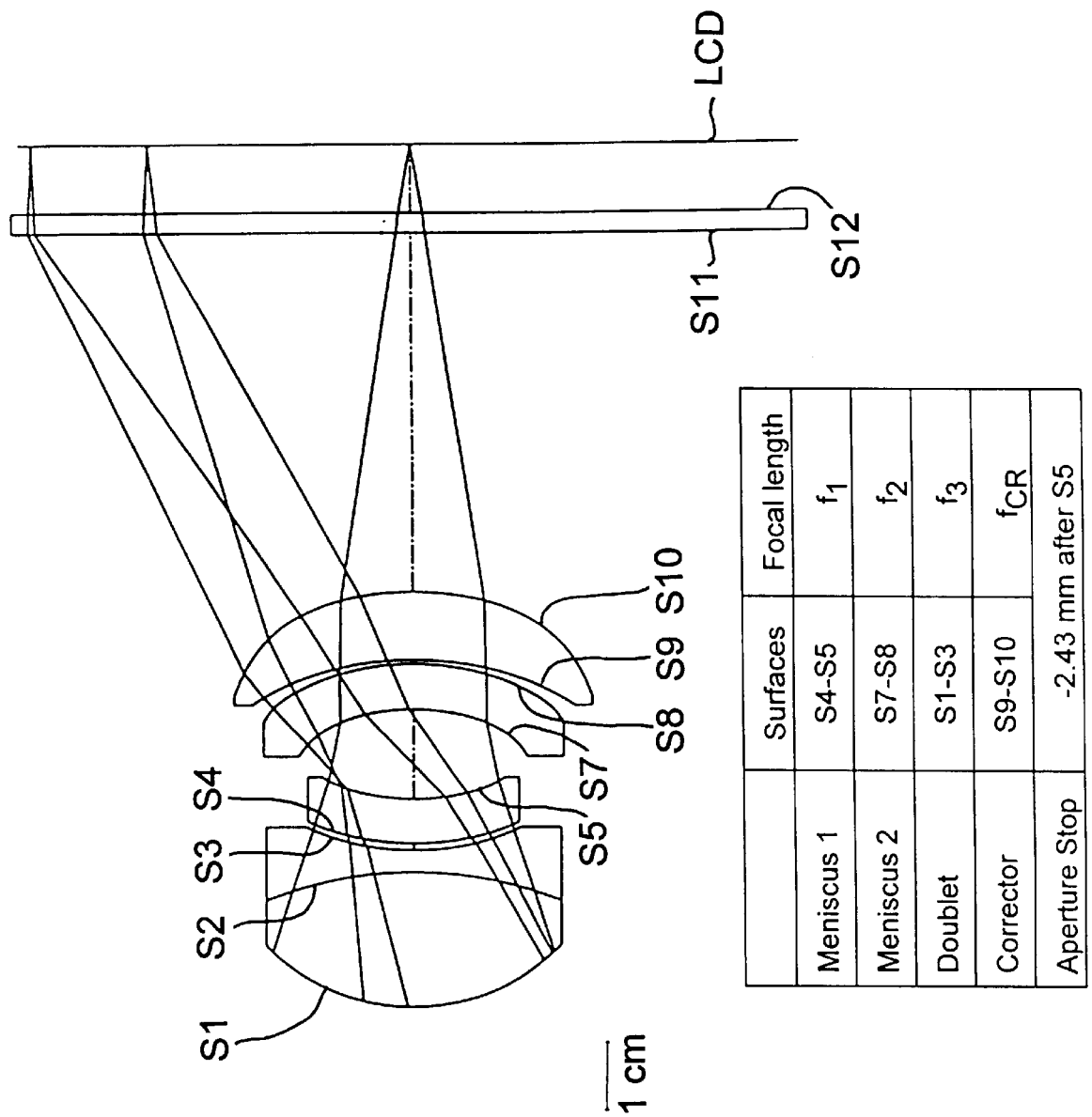
FIG. 7 is a schematic side view of a seventh projection lens constructed in accordance with the invention.
Figure 8:
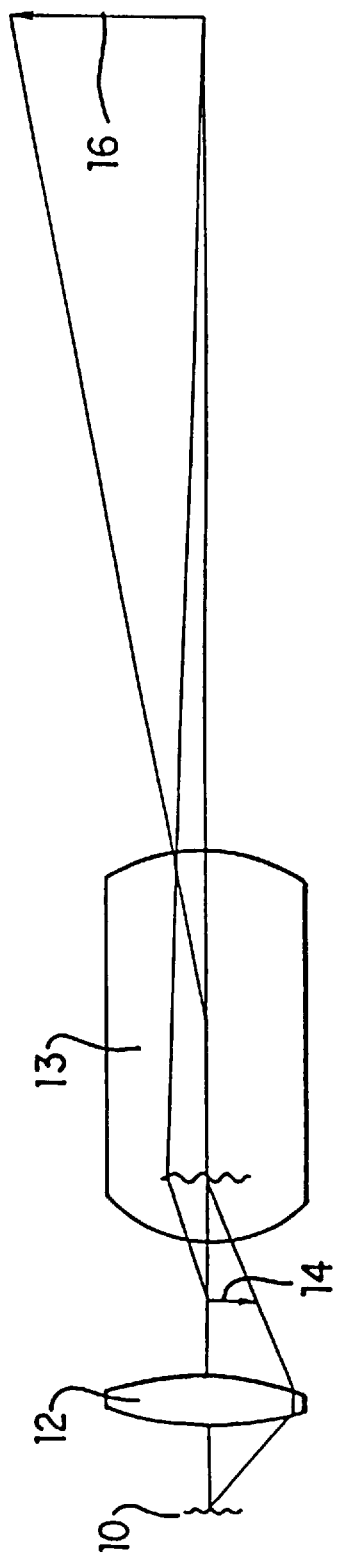
FIG. 8 is a schematic diagram showing an overall projection lens system in which the projection lens of the present invention can be used.

FIGS. 1 to 7 illustrate various projection lenses constructed in accordance with the invention. Corresponding prescriptions and optical properties appear in Tables 1 to 7, respectively. HOYA or SCHOTT designations are used for the glasses employed in the lens systems. Equivalent glasses made by other manufacturers can be used in the practice of the invention. Industry acceptable materials are used for the styrene and acrylic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The abbreviations used in the tables are as follows:

| | |
|---|---|
| EFL | effective focal length |
| FVD | front vertex distance |
| f/ | f-number |
| ENP | entrance pupil |
| EXP | exit pupil |
| BRL | barrel length |
| OBJ HT | object height |
| MAG | magnification |
| STOP | location of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or I in the above equation is not zero. The designation "c" represents a conic surface for which the k value in the above equation is not zero. The designation "f" represents a Fresnel lens surface. All dimensions given in the tables are in millimeters. The tables are constructed on the assumption that light travels from left to right in the figures. In actual practice, the viewing screen will be on the left and the LCD panel will be on the right, and light will travel from right to left. Surface 11 in Table 5 is an artificial stop which forces the system to be telecentric on the short conjugate side of the Fresnel lens; surface 6 in Table 7 is a vignetting surface.

Table 8 summarizes various properties of the lens systems of FIGS. 1–7. The "overall focal length" which appears in this table does not include the Fresnel lens for FIGS. 5–7 since that lens serves basically only to couple the lens system to the illumination optics. The "distance between menisci" values of the table are measured between the outer surfaces (vertices) of the facing menisci. The "aperture stop position" is the absolute value of the distance of the aperture stop from the central point of those outer surfaces. The "corrector focal length" is for the leading lens element of FIG. 2 and the trailing lens element of FIGS. 5–7.

Table 8 shows that the doublet is the strongest component of the system for all examples in that its focal length is shorter than the magnitude of the focal length of every other element in the system. The table also shows that except for Example 6, the menisci are of weak optical power, i.e., the ratio of the magnitude of the focal length of each meniscus to the overall focal length of the system is greater than 2.0. Similarly, the optical power of the corrector lens element, where used, is weak, i.e., the ratio of the magnitude of its focal length to the overall focal length of the system is also greater than 2.0.

The table further illustrates that the aperture stop is either located between the facing menisci (Examples 1–2 and 5–7) or in the vicinity thereof (Examples 3–4). Location between the menisci is preferred. The aperture stop is considered to be located within the vicinity of the menisci if the ratio of the magnitude of its distance from the central point of the outer surfaces of the menisci to the distance between those outer surfaces is less than 0.60 (Example 4) and preferably less than 0.55 (Example 3).

An examination of Tables 1–7 illustrates another preferred feature of the projection lenses of the invention, namely, the close spacing between the color-correcting doublet and the facing menisci, i.e., that spacing is preferably less than 0.3 times the overall focal length of the projection lens. Similarly, the corrector lens element, when used, is also preferably closely spaced to the facing menisci, i.e., that spacing is again preferably less than 0.3 times the overall focal length of the projection lens.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

Lens Data

| Surf. No. | Type | Radius | Thickness | Glass | Clear Aperture Diameter |
|---|---|---|---|---|---|
| 1 | a | 30.0023 | 8.00000 | ACRYLIC | 44.87 |
| 2 | a | 24.9608 | 29.76190 | | 37.56 |
| 3 | a | −24.9608 | 8.00000 | ACRYLIC | 39.36 |
| 4 | a | −30.0023 | 1.00000 | | 45.80 |
| 5 | | −2875.5764 | 3.00000 | F2 | 51.16 |
| 6 | | 52.1781 | 20.00000 | SK5 | 57.31 |
| 7 | | −54.3179 | 141.16060 | | 58.89 |

PUZ,1/10 Symbol Description a-Polynomial asphere
Focal Shift = −0.07359

Even Polynomial Aspheres

| Surf. No | D | E | F | G | H | I |
|---|---|---|---|---|---|---|
| 1 | $1.2884E-07$ | $2.8838E-09$ | $-1.0091E-11$ | $3.5519E-14$ | $-6.8241E-17$ | $6.9094E-20$ |
| 2 | $1.3279E-06$ | $-3.2546E-09$ | $1.2088E-11$ | $9.1703E-14$ | $-4.8592E-16$ | $7.5718E-19$ |
| 3 | $-1.3279E-06$ | $3.2546E-09$ | $-1.2088E-11$ | $-9.1703E-14$ | $4.8592E-16$ | $-7.5718E-19$ |
| 4 | $-1.2884E-07$ | $-2.8838E-09$ | $1.0091E-11$ | $-3.5519E-14$ | $6.8241E-17$ | $-6.9094E-20$ |

WAVELENGTHS

| | | | | |
|---|---|---|---|---|
| 0.54610 | 0.48000 | 0.64380 | 0.43580 | 0.70652 |

SYSTEM FIRST ORDER PROPERTIES

OBJ. HT: −762.00                f/ 2.90   MAG: −0.0600
STOP: 4.66 after surface        2. DIA: 36.640
EFL: 119.048         FVD: 210.923         ENP: 11.4341
IMD: 141.161         BRL: 69.7619         EXP: −105.441
OBD: −2031.87        OVL: 2242.79

First Order Properties of Elements

| Element Number | Surface Numbers | | Power | f' | lpp | l'pp |
|---|---|---|---|---|---|---|
| 1 | 1 | 2 | $-0.15806E-02$ | −632.68 | 67.029 | 55.766 |
| 2 | 3 | 4 | $-0.15806E-02$ | −632.68 | −55.766 | −67.029 |
| 3 | 5 | 6 | $-0.12182E-01$ | −82.086 | 1.8136 | $-0.32908E-01$ |
| 4 | 6 | 7 | $0.20672E-01$ | 48.375 | 6.6194 | −6.8909 |

First-Order Properties of Doublets

| Element Numbers | | Surface Numbers | | Power | f' | lpp | l'pp |
|---|---|---|---|---|---|---|---|
| 3 | 4 | 5 | 7 | $0.10165E-01$ | 98.379 | 15.342 | 1.0819 |

First Order Properties of the Lens

| Zoom Position Number | Power | f' | lpp | l'pp |
|---|---|---|---|---|
| N/A | $0.84000E-02$ | 119.05 | 71.315 | 15.043 |

TABLE 2

Lens Data

| Surf. No. | Type | Radius | Thickness | Glass | Clear Aperture Diameter |
|---|---|---|---|---|---|
| 1 | a | 80.0000 | 10.00000 | ACRYLIC | 64.29 |
| 2 | a | 200.0000 | 0.50000 | | 59.26 |
| 3 | a | 29.0511 | 8.00000 | ACRYLIC | 49.90 |
| 4 | a | 22.4661 | 29.59616 | | 40.09 |
| 5 | a | -22.4661 | 8.00000 | ACRYLIC | 34.57 |
| 6 | a | -29.0511 | 0.50000 | | 39.77 |
| 7 | | -234.1952 | 3.00000 | F2 | 41.07 |
| 8 | | 44.3713 | 16.00000 | SK5 | 43.17 |
| 9 | | -44.3713 | 118.83699 | | 44.97 |

Symbol Description a-Polynomial asphere
Focal Shift = -0.70675

Even Polynomial Aspheres

| Surf. No | D | E | F | G | H | I |
|---|---|---|---|---|---|---|
| 1 | 2.1107E - 06 | -3.4815E - 10 | 2.0450E - 12 | 6.8909E - 16 | -1.4974E - 18 | 1.1302E - 21 |
| 2 | 1.7984E - 06 | 1.0365E - 09 | 9.1578E - 13 | 1.3971E - 15 | 8.9705E - 19 | -1.5435E - 21 |
| 3 | 2.5443E - 06 | 1.0338E - 09 | -7.7806E - 12 | 1.2923E - 14 | -7.8923E - 18 | -6.2206E - 22 |
| 4 | -3.9686E - 06 | -9.4447E - 11 | -1.5516E - 11 | -3.8312E - 14 | 1.6654E - 16 | -2.7211E - 19 |
| 5 | 3.9686E - 06 | 9.4447E - 11 | 1.5516E - 11 | 3.8312E - 14 | -1.6654E - 16 | 2.7211E - 19 |
| 6 | 2.5443E - 06 | -1.0338E - 09 | 7.7806E - 12 | -1.2923E - 14 | 7.8923E - 18 | 6.2206E - 22 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES

OBJ. HT: -762.00  f/ 2.90  MAG: -0.0600
STOP: 16.26 after surface 4.  DIA: 34.456
EFL: 118.996  FVD: 194.433  ENP: 37.2862
IMD: 118.837  BRL: 75.5962  EXP: -56.3663
OBD: -2029.88  OVL: 2224.32

First Order Properties of Elements

| Element Number | Surface Numbers | | Power | f' | lpp | l'pp |
|---|---|---|---|---|---|---|
| 1 | 1 | 2 | 0.38053E - 02 | 262.79 | -4.3433 | -10.858 |
| 2 | 3 | 4 | -0.29712E - 02 | -335.43 | 39.483 | 30.533 |
| 3 | 5 | 6 | -0.29812E - 02 | -335.43 | -30.533 | -39.483 |
| 4 | 7 | 8 | -0.16799E - 01 | -59.528 | 1.5466 | -0.29302 |
| 5 | 8 | 9 | 0.24872E - 01 | 40.206 | 5.3880 | -5.3880 |

First-Order Properties of Doublets

| Element NumberS | | Surface Numbers | | Power | f' | lpp | l'pp |
|---|---|---|---|---|---|---|---|
| 4 | 5 | 7 | 9 | 0.10446E - 01 | 95.727 | 15.072 | 3.7477 |

First Order Properties of the Lens

| Zoom Position Number | Power | f' | lpp | l'pp |
|---|---|---|---|---|
| N/A | 0.84036E - 02 | 119.00 | 72.381 | -6.5921 |

TABLE 3

Lens Data

| Surf. No. | Type | Radius | Thickness | Glass | Clear Aperture Diameter |
|---|---|---|---|---|---|
| 1 | | 39.1113 | 20.00000 | SK5 | 51.11 |
| 2 | | −109.9088 | 3.00000 | F2 | 42.37 |
| 3 | | 56.5025 | 0.02133 | | 35.13 |
| 4 | a | 25.4140 | 8.00000 | ACRYLIC | 33.39 |
| 5 | a | 25.0802 | 15.14509 | | 27.51 |
| 6 | a | −25.0802 | 8.00000 | ACRYLIC | 27.32 |
| 7 | a | −25.4140 | 71.84562 | | 34.22 |

Symbol Description a - Polynomial asphere
Focal Shift = −1.29081

Even Polynomial Aspheres

| Surf. No. | D | E | F | G | H | I |
|---|---|---|---|---|---|---|
| 4 | 9.3348E-06 | 6.1762E-10 | 1.3737E-10 | −1.3591E-13 | −1.3300E-15 | 6.5744E-18 |
| 5 | 1.6160E-05 | 9.7479E-08 | −4.0004E-10 | 2.8906E-13 | 1.6794E-14 | −2.5935E-17 |
| 6 | −1.6160E-05 | −9.7479E-08 | 4.0004E-10 | −2.8906E-13 | −1.6794E-14 | 2.5935E-17 |
| 7 | −9.3348E-06 | −6.1762E-10 | −1.3737E-10 | 1.3591E-13 | 1.3300E-15 | −6.5744E-18 |

WAVELENGTHS 0.54610   0.48000   0.64380   0.43580   0.70652

SYSTEM FIRST ORDER PROPERTIES

| | | | | | |
|---|---|---|---|---|---|
| OBJ. HT: | −762.00 | f/ | 2.90 | MAG: | −0.0600 |
| STOP: | 1.48 after surface 2. DIA: 36.956 | | | | |
| EFL: | 119.003 | FVD: | 126.012 | ENP: | 16.9311 |
| IMO: | 71.8456 | BPL: | 54.1664 | EXP: | −32.9660 |
| OBO: | −2109.55 | OVL: | 2235.56 | | |

First Order Properties of Elements

| Element Number | Surface Numbers | | Power | f' | 1pp | 1'pp |
|---|---|---|---|---|---|---|
| 1 | 1 | 2 | 0.19480E-01 | 51.335 | 3.4715 | −9.7556 |
| 2 | 2 | 3 | −0.16839E-01 | −59.385 | 1.2116 | −0.62288 |
| 3 | 4 | 5 | 0.17900E-02 | 558.66 | −58.905 | −58.131 |
| 4 | 6 | 7 | 0.17900E-02 | 558.66 | 58.131 | 58.905 |

First-Order Properties of Doublets

| Element Numbers | | Surface Numbers | | Power | f' | 1pp | 1'pp |
|---|---|---|---|---|---|---|---|
| 1 | 2 | 1 | 3 | 0.62383E-02 | 160.30 | −26.132 | −34.869 |

First Order Properties of the Lens

| Zoom Position Number | Power | f' | 1pp | 1'pp |
|---|---|---|---|---|
| N/A | 0.84032E-02 | 119.00 | −7.1680 | −53.007 |

TABLE 4

Lens Data

| Surf. No. | Type | Radius | Thickness | Glass | Clear Aperture Diameter |
|---|---|---|---|---|---|
| 1 | | 36.9251 | 3.00000 | F2 | 47.74 |
| 2 | | 22.2592 | 15.00000 | SK5 | 40.35 |
| 3 | | 49.2463 | 0.02133 | | 36.53 |
| 4 | a | 25.5722 | 8.00000 | ACRYLIC | 35.00 |

TABLE 4-continued

| | | | | | |
|---|---|---|---|---|---|
| 5 | a | 25.9015 | 18.73549 | | 29.13 |
| 6 | a | −25.9015 | 8.00000 | ACRYLIC | 29.59 |
| 7 | a | −25.5722 | 73.75932 | | 36.28 |

Symbol Description a - Polynomial asphere
Focal Shift = −1.45996

Even Polynomial Aspheres

| Surf. No. | D | E | F | G | H | I |
|---|---|---|---|---|---|---|
| 4 | 9.5718E-06 | −5.4522E-09 | 1.4180E-10 | −1.4316E-13 | −1.3364E-15 | 5.5038E-18 |
| 5 | 1.5679E-05 | 9.1338E-08 | −3.4546E-10 | −3.4615E-13 | 1.3504E-14 | −1.3390E-17 |
| 6 | −1.5679E-05 | −9.1338E-08 | 3.4546E-10 | 3.4615E-13 | −1.3504E-14 | 1.3390E-17 |
| 7 | −9.5718E-06 | 5.4522E-09 | −1.4180E-10 | 1.4316E-13 | 1.3364E-15 | −5.5038E-18 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES

| | | | | | |
|---|---|---|---|---|---|
| OBJ. HT: | −762.00 | f/ | 2.90 | MAG: | −0.0600 |
| STOP: | 12.70 after surface 2. | DIA: 39.268 | | | |
| EFL: | 119.000 | FVD: | 126.516 | ENP: | 11.6502 |
| IMD: | 73.7593 | BRL: | 52.7568 | EXP: | −38.8206 |
| OBD: | −2104.15 | OVL: | 2230.66 | | |

First Order Properties of Elements

| Element Number | Surface Numbers | | Power | f' | 1pp | 1'pp |
|---|---|---|---|---|---|---|
| 1 | 1 | 2 | −0.10260E-01 | −97.463 | 5.0476 | 3.0428 |
| 2 | 2 | 3 | 0.17568E-01 | 56.922 | −6.4433 | −14.255 |
| 3 | 4 | 5 | 0.22169E-02 | 451.09 | −46.054 | −46.647 |
| 4 | 6 | 7 | 0.22169E-02 | 451.09 | 46.647 | 46.054 |

First-Order Properties of Doublets

| Element Numbers | | Surface Numbers | | Power | f' | 1pp | 1'pp |
|---|---|---|---|---|---|---|---|
| 1 | 2 | 1 | 3 | 0.55976E-02 | 178.65 | −24.724 | −31.643 |

First Order Properties of the Lens

| Zoom Position Number | Power | f' | 1pp | 1'pp |
|---|---|---|---|---|
| N/A | 0.84034E-02 | 119.00 | −1.8193 | −50.920 |

TABLE 5

Lens Data

| Surf. No. | Type | Radius | Thickness | Glass | Clear Aperture Diameter |
|---|---|---|---|---|---|
| 1 | | 33.1198 | 15.00000 | SK5 | 43.45 |
| 2 | | −70.5388 | 3.00000 | F2 | 39.47 |
| 3 | | 64.9694 | 0.20000 | | 34.97 |
| 4 | a | 22.3871 | 6.00000 | ACRYLIC | 32.19 |
| 5 | a | 18.0073 | 18.43017 | | 26.67 |
| 6 | a | −18.0073 | 6.00000 | ACRYLIC | 25.45 |
| 7 | a | −22.3871 | 0.50000 | | 31.44 |
| 8 | | −300.0000 | 6.00000 | ACRYLIC | 37.27 |
| 9 | a | −94.4823 | 59.52572 | | 40.14 |
| 10 | a f | 75.0000 | 3.00000 | ACRYLIC | 90.30 |
| 11 | | ∞ | −9999.99902 | | 90.43 |
| 12 | | ∞ | 10009.94644 | | 4285.85 |

TABLE 5-continued

Symbol Description a - Polynomial asphere
f - Fresnel
Focal Shift = −1.00766

Even Polynomial Aspheres

| Surf No. | D | E | F | G | H | I |
|---|---|---|---|---|---|---|
| 4 | 8.8261E-06 | −6.3031E-08 | 5.0057E-10 | −7.7626E-13 | −3.3165E-15 | 1.2365E-17 |
| 5 | 1.4180E-05 | −1.0090E-07 | 1.0531E-09 | 9.3555E-13 | −3.9394E-14 | 1.4740E-16 |
| 6 | −1.4180E-05 | 1.0090E-07 | −1.0531E-09 | −9.3555E-13 | 3.9394E-14 | −1.4740E-16 |
| 7 | −8.8261E-06 | 6.3031E-08 | −5.0057E-10 | 7.7626E-13 | 3.3165E-15 | −1.2365E-17 |
| 9 | −1.9383E-06 | 1.0274E-09 | 7.0216E-13 | −4.3876E-15 | −9.2113E-18 | 2.7872E-20 |
| 10 | −1.7284E-07 | −1.5754E-10 | 9.0633E-14 | −2.3590E-17 | −2.3498E-20 | 9.8370E-24 |

WAVELENGTHS

| 0.54610 | 0.48000 | 0.64380 | 0.43580 | 0.70652 |
|---|---|---|---|---|

SYSTEM FIRST ORDER PROPERTIES

| OBJ. HT: | −762.00 | f/ | 2.90 | MAG: | −0.0600 |
|---|---|---|---|---|---|
| STOP: | 11.16 after surface 2. | DIA: 31.920 | | | |
| EFL: | 119.007 | FVD: | 127.604 | ENP: | 22.9392 |
| IMD: | 10009.9 | BRL: | −9882.34 | EXP: | 9760.21 |
| OBD: | −2018.64 | OVL: | 2146.25 | | |

First Order Properties of Elements

| Element Number | Surface Numbers | | Power | f' | lpp | l'pp |
|---|---|---|---|---|---|---|
| 1 | 1 | 2 | 0.24830E-01 | 40.274 | 3.1827 | −6.7785 |
| 2 | 2 | 3 | −0.18610E-01 | −53.735 | 0.95345 | −0.87817 |
| 3 | 4 | 5 | −0.29354E-02 | −340.67 | 37.522 | 30.181 |
| 4 | 6 | 7 | −0.29354E-02 | −340.67 | −30.181 | −37.522 |
| 5 | 8 | 9 | 0.36148E-02 | 276.64 | 5.8072 | 1.8289 |
| 6 | 10 | 11 | 0.65837E-02 | 151.89 | 0.00000E+00 | −2.0083 |

First-Order Properties of Doublets

| Element Numbers | | Surface Numbers | | Power | f' | lpp | l'pp |
|---|---|---|---|---|---|---|---|
| 1 | 2 | 1 | 3 | 0.97931E-02 | 102.11 | −11.511 | −20.483 |

First Order Properties of the Lens

| Zoom Position Number | Power | f' | lpp | l'pp |
|---|---|---|---|---|
| N/A | 0.84029E-02 | 119.01 | 83.807 | 9884.8 |

TABLE 6

Lens Data

| Surf. No. | Type | Radius | Thickness | Glass | Clear Aperture Diameter |
|---|---|---|---|---|---|
| 1 | | 29.1621 | 17.00000 | SK18 | 45.89 |
| 2 | | −139.4548 | 3.00000 | F2 | 39.89 |
| 3 | | 26.9691 | 0.50000 | | 30.20 |
| 4 | a | 26.5557 | 6.00000 | ACRYLIC | 29.72 |
| 5 | a | 32.7898 | 13.49087 | | 26.02 |
| 6 | a | −32.7898 | 6.00000 | ACRYLIC | 26.60 |
| 7 | a | −26.5557 | 1.00000 | | 30.84 |
| 8 | a | −23.0582 | 9.00000 | ACRYLIC | 31.49 |
| 9 | a | −30.5640 | 59.03559 | | 39.98 |
| 10 | cf | 61.9388 | 3.00000 | ACRYLIC | 110.75 |
| 11 | | ∞ | 9.99761 | | 110.60 |

TABLE 6-continued

Symbol Description a - Polynomial asphere
c - Conic section
f - Fresnel
Focal Shift = −1.11420

Conics

| Surface Number | Constant |
|---|---|
| 10 | −1.2035E + 00 |

Even Polynomial Aspheres

| Surf. No. | D | E | F | G | H | I |
|---|---|---|---|---|---|---|
| 4 | 1.3240E-05 | −5.5822E-08 | 5.4959E-10 | −8.6016E-13 | −3.1443E-15 | 1.4241E-17 |
| 5. | 2.6931E-05 | −6.9112E-08 | 1.0553E-09 | −1.2398E-12 | −1.7533E-14 | 8.7717E-17 |
| 6 | −2.6931E-05 | 6.9112E-08 | −1.0553E-09 | 1.2398E-12 | 1.7533E-14 | −8.7717E-17 |
| 7 | −1.3240E-05 | 5.5822E-08 | −5.4959E-10 | 8.6016E-13 | 3.1443E-15 | −1.4241E-17 |
| 8 | 4.8903E-06 | −4.3360E-08 | 9.8937E-11 | 5.1194E-14 | −1.7310E-15 | 2.3803E-18 |
| 9 | −3.0755E-06 | −3.1743E-09 | −3.9576E-11 | 7.3867E-14 | −4.2264E-17 | −1.9105E-19 |

WAVELENGTHS

| 0.54610 | 0.48000 | 0.64380 | 0.43580 | 0.70652 |
|---|---|---|---|---|

SYSTEM FIRST ORDER PROPERTIES

| OBJ. HT: | −916.40 | f/ | 2.90 | MAG: | −0.0600 |
|---|---|---|---|---|---|
| STOP: | 10.29 after surface 2. DIA 28.290 | | | | |
| EFL: | 119.000 | FVD: | 128.024 | ENP: | 26.3928 |
| IMD: | 9.99761 | BRL: | 118.026 | EXP: | −331.152 |
| OBD: | −1999.20 | OVL: | 2127.22 | | |

First Order Properties of Elements

| Element Number | Surface Numbers | | Power | f' | 1pp | 1'pp |
|---|---|---|---|---|---|---|
| 1 | 1 | 2 | 0.25541E-01 | 39.152 | 1.8648 | −8.9177 |
| 2 | 2 | 3 | −0.27807E-01 | −35.962 | 1.5372 | −0.29728 |
| 3 | 4 | 5 | 0.46598E-02 | 214.60 | −12.980 | −16.028 |
| 4 | 6 | 7 | 0.46598E-02 | 214.60 | 16.028 | 12.980 |
| 5 | 8 | 9 | −0.31745E-02 | −315.01 | −30.662 | −40.643 |
| 6 | 10 | 11 | 0.79720E-02 | 125.44 | 0.00000E+00 | −2.0083 |

First-Order Properties of Doublets

| Element Numbers | | Surface Numbers | | Power | f' | 1pp | 1'pp |
|---|---|---|---|---|---|---|---|
| 1 | 2 | 1 | 3 | 0.51599E-02 | 193.80 | −54.477 | −52.049 |

First Order Properties of the Lens

| Zoom Position Number | Power | f' | 1pp | 1'pp |
|---|---|---|---|---|
| N/A | 0.84034E-02 | 119.00 | 103.14 | −115.03 |

TABLE 7

Lens Data

| Surf. No. | Type | Radius | Thickness | Glass | Clear Aperture Diameter |
|---|---|---|---|---|---|
| 1 | | 30.7661 | 19.80000 | SK18 | 41.40 |
| 2 | | −58.5206 | 3.30000 | F2 | 35.61 |
| 3 | | 37.2142 | Space 1 | | 29.59 |
| 4 | a | 40.6518 | 6.60000 | ACRYLIC | 29.14 |
| 5 | a | 34.9013 | 6.62246 | | 25.02 |

TABLE 7-continued

Lens Data

| | | | | | |
|---|---|---|---|---|---|
| 6 | | ∞ | 6.62246 | | 29.37 |
| 7 | a | −34.9013 | 6.60000 | ACRYLIC | 31.71 |
| 8 | a | −40.6518 | 0.60000 | | 42.19 |
| 9 | a | −52.8199 | 10.00000 | ACRYLIC | 45.48 |
| 10 | a | −48.2409 | Space 2 | | 50.68 |
| 11 | cf | 55.0000 | 3.00000 | ACRYLIC | 112.30 |
| 12 | | ∞ | Image distance | | 112.13 |

Symbol Description a - Polynomial asphere
c - Conic section
f - Fresnel

Conics

| Surface Number | Constant |
|---|---|
| 11 | −1.5284E + 00 |

Even Polynomial Aspheres

| Surf. No. | D | E | F | G | H | I |
|---|---|---|---|---|---|---|
| 4 | 5.6499E-07 | 1.0989E-08 | −2.5366E-11 | 6.6086E-14 | −2.9414E-16 | 6.0750E-19 |
| 5 | 1.2882E-05 | 3.6695E-09 | 2.5220E-10 | −5.7330E-13 | −1.4211E-15 | 1.0348E-17 |
| 7 | −1.2882E-05 | −3.6695E-09 | −2.5220E-10 | 5.7330E-13 | 1.4211E-15 | −1.0348E-17 |
| 8 | −5.6499E-07 | −1.0989E-08 | 2.5366E-11 | −6.6086E-14 | 2.9414E-16 | −6.0750E-19 |
| 9 | −2.4565E-06 | −3.8370E-09 | 1.3708E-11 | 3.4604E-15 | −5.1456E-17 | 3.4596E-20 |
| 10 | −7.0933E-06 | −1.4066E-09 | −8.6822E-12 | 9.4656E-16 | 1.8208E-19 | −2.1320E-20 |

Variable Spaces

| Zoom Pos. | Space 1 T(3) | Space 2 T(10) | Focal Shift | Image Distance |
|---|---|---|---|---|
| 1 | 1.100 | 52.725 | 0.146 | 9.999 |
| 2 | 0.900 | 48.200 | 0.358 | 10.032 |
| 3 | 1.300 | 60.500 | −0.140 | 9.993 |

WAVELENGTHS

| | | | | |
|---|---|---|---|---|
| 0.54610 | 0.48000 | 0.64380 | 0.43580 | 0.70652 |

SYSTEM FIRST ORDER PROPERTIES, POS 1

| | | | | | |
|---|---|---|---|---|---|
| OBJ. HT: | −916.40 | f/ | 2.90 | MAG: | −0.0600 |
| STOP: | −2.43 after surface 5. DIA: 27.159 | | | | |
| EFL: | 119.000 | FVD: | 126.969 | ENP: | 26.3422 |
| IMD: | 9.99931 | BRL: | 116.970 | EXP: | −393.868 |
| OBD: | −1992.70 | OVL: | 2119.67 | | |

SYSTEM FIRST ORDER PROPERTIES, POS 2

| | | | | | |
|---|---|---|---|---|---|
| OBJ. HT: | −2291.1 | f/ | 2.82 | MAG: | −0.0240 |
| STOP: | −2.43 after surface 5. DIA: 26.751 | | | | |
| EFL: | 114.312 | FVD: | 122.277 | ENP: | 25.9078 |
| IMD: | 10.0317 | BRL: | 112.245 | EXP: | −315.825 |
| OBD: | −4777.58 | OVL: | 4899.85 | | |

SYSTEM FIRST ORDER PROPERTIES, POS 3

| | | | | | |
|---|---|---|---|---|---|
| OBJ. HT: | −458.20 | f/ | 3.15 | MAG: | −0.1200 |
| STOP: | −2.43 after surface 5. DIA: 26.834 | | | | |
| EFL: | 127.815 | FVD: | 134.938 | ENP: | 26.7790 |
| IMD: | 9.99319 | BRL: | 124.945 | EXP: | −625.681 |
| OBD: | −1064.68 | OVL: | 1199.62 | | |

First Order Properties of Elements

| Element Number | Surface Numbers | | Power | f' | 1pp | 1'pp |
|---|---|---|---|---|---|---|
| 1 | 1 | 2 | 0.29047E-01 | 34.427 | 4.5512 | −8.6569 |
| 2 | 2 | 3 | −0.27798E-01 | −35.974 | 1.2258 | −0.77953 |
| 3 | 4 | 5 | −0.12420E-02 | −805.14 | 50.329 | 43.210 |

TABLE 7-continued

Lens Data

| 4 | 7 | 8 | −0.12420E−02 | −805.14 | −43.210 | −50.329 |
| 5 | 9 | 10 | 0.15279E−02 | 654.50 | 44.847 | 40.960 |
| 6 | 11 | 12 | 0.89778E−02 | 111.39 | 0.00000E + 00 | −2.0083 |

First-Order Properties of Doublets

| Element Numbers | | Surface Numbers | | Power | f' | 1pp | 1'pp |
|---|---|---|---|---|---|---|---|
| 1 | 2 | 1 | 3 | 0.92286E−02 | 108.36 | −25.217 | −31.885 |

First Order Properties of Groups

| Group Number | Surface Numbers | | Power | f' | 1pp | 1'pp |
|---|---|---|---|---|---|---|
| 1 | 1 | 3 | 0.92286E−02 | 108.36 | −25.217 | −31.885 |
| 2 | 4 | 10 | −0.63514E−03 | −1574.5 | −126.19 | −173.51 |
| 3 | 11 | 12 | 0.89778E−02 | 111.39 | 0.00000E + 00 | −2.0083 |

First Order Properties of the Lens

| Zoom Position Number | Power | f' | 1pp | 1'pp |
|---|---|---|---|---|
| 1 | 0.84033E−02 | 119.00 | 109.63 | −116.29 |
| 2 | 0.87480E−02 | 114.31 | 99.733 | −107.38 |
| 3 | 0.78238E−02 | 127.82 | 128.27 | −133.02 |

TABLE 8

| Example Number | Doublet Focal Length | Meniscus 1 Focal Length | Meniscus 2 Focal Length | Corrector Focal Length | Overall Focal Length | Distance Between Menisci | Aperture Stop Position |
|---|---|---|---|---|---|---|---|
| 1 | 98.38 | −632.68 | −632.68 |  | 119.05 | 45.76 | 10.22 |
| 2 | 95.73 | −335.43 | −335.43 | 262.79 | 119.00 | 45.60 | 1.46 |
| 3 | 160.30 | 558.66 | 558.66 |  | 119.00 | 31.15 | 17.12 |
| 4 | 178.65 | 451.09 | 451.09 |  | 119.00 | 34.74 | 19.69 |
| 5 | 102.11 | −340.67 | −340.67 | 276.64 | 119.01 | 30.43 | 7.26 |
| 6 | 193.80 | 214.60 | 214.60 | −315.01 | 119.00 | 25.49 | 5.96 |
| 7 | 108.36 | −805.14 | −805.14 | 654.50 | 119.00 | 26.44 | 9.05 |

What is claimed is:

1. A projection lens for forming a magnified image of an object, said lens having an aperture stop, a short conjugate, and a long conjugate, said lens comprising:
   (a) two meniscus elements having focal lengths $f_1$ and $f_2$, said meniscus elements being (i) concave to each other and (ii) located in the vicinity of the aperture stop, each meniscus element having at least one aspherical surface; and
   (b) a color-correcting doublet having a focal length $f_3$ and comprising a positive crown element and a negative flint element, where:
   (i) $f_3 > 0$;
   (ii) $f_3 < |f_1|$;
   (iii) $f_3 < |f_2|$;
   (iv) the projection lens has an object side associated with the short conjugate and an image side associated with the long conjugate; and
   (v) the two meniscus elements are on the object side of the projection lens and the color-correcting doublet is on the image side of the projection lens.

2. A projection lens for forming an image of an object, said lens having an aperture stop and consisting of:
   (a) two meniscus elements having focal lengths $f_1$ and $f_2$, said meniscus elements being (i) concave to each other and (ii) located in the vicinity of the aperture stop, each meniscus element having at least one aspherical surface; and
   (b) a color-correcting doublet having a focal length $f_3$ and comprising a positive crown element and a negative flint element, where:
   $f_3 > 0$;
   $f_3 < |f_1|$; and
   $f_3 < |f_2|$.

3. A projection lens for forming an image of an object, said lens having an aperture stop and consisting of:
   (a) two meniscus elements having focal lengths $f_1$ and $f_2$, said meniscus elements being (i) concave to each other and (ii) located in the vicinity of the aperture stop, each meniscus element having at least one aspherical surface;
   (b) a color-correcting doublet having a focal length $f_3$ and comprising a positive crown element and a negative flint element, where:
   $f_3 > 0$;
   $f_3 < |f_1|$;
   $f_3 < |f_2|$; and
   (c) a corrector lens element which has at least one aspherical surface and is of weak optical power;

said color correcting doublet and said corrector lens element being on opposite sides of said two meniscus elements.

4. A projection lens system for forming a magnified image of an object, said system comprising:
   (a) an illumination system comprising a light source and illumination optics which forms an image of the light source, said image of the light source being the output of the illumination system;
   (b) a pixelized panel which comprises the object; and
   (c) a projection lens having an aperture stop, a short conjugate, and a long conjugate, said lens comprising:
      (A) two meniscus elements having focal lengths $f_1$ and $f_2$, said meniscus elements being (i) concave to each other and (ii) located in the vicinity of the aperture stop, each meniscus element having at least one aspherical surface; and
      (B) a color-correcting doublet having a focal length $f_3$ and comprising a positive crown element and a negative flint element, where:
         (i) $f_3>0$;
         (ii) $f_3<|f_1|$;
         (iii) $f_3<|f_2|$;
         (iv) the projection lens has an object side associated with the short conjugate and an image side associated with the long conjugate; and
         (v) the two meniscus elements are on the object side of the projection lens and the color-correcting doublet is on the image side of the projection lens.

5. A projection lens system for forming an image of an object, said system comprising:
   (a) an illumination system comprising a light source and illumination optics which forms an image of the light source, said image of the light source being the output of the illumination system;
   (b) a pixelized panel which comprises the object; and
   (c) a projection lens having an aperture stop and consisting of:
      (A) two meniscus elements having focal lengths $f_1$ and $f_2$, said meniscus elements being (i) concave to each other and (ii) located in the vicinity of the aperture stop, each meniscus element having at least one aspherical surface; and
      (B) a color-correcting doublet having a focal length $f_3$ and comprising a positive crown element and a negative flint element, where:
         $f_3>0$;
         $f_3<|f_1|$; and
         $f_3<|f_2|$.

6. A projection lens system for forming an image of an object, said system comprising:
   (a) an illumination system comprising a light source and illumination optics which forms an image of the light source, said image of the light source being the output of the illumination system;
   (b) a pixelized panel which comprises the object; and
   (c) a projection lens having an aperture stop and consisting of:
      (A) two meniscus elements having focal lengths $f_1$ and $f_2$, said meniscus elements being (i) concave to each other and (ii) located in the vicinity of the aperture stop, each meniscus element having at least one aspherical surface;
      (B) a color-correcting doublet having a focal length $f_3$ and comprising a positive crown element and a negative flint element, where:
         $f_3>0$;
         $f_3<|f_1|$;
         $f_3<|f_2|$; and
      (C) a corrector lens element which has at least one aspherical surface and is of weak optical power;
      said color correcting doublet and said corrector lens element being on opposite sides of said two meniscus elements.

7. The projection lens of claim 1, 2, or 3 wherein the meniscus elements each have a weak optical power.

8. The projection lens of claim 1, 2, or 3 wherein the meniscus elements are identical.

9. The projection lens of claim 1, 2, or 3 wherein each meniscus element has two aspherical surfaces.

10. The projection lens of claim 1, 2, or 3 wherein the aperture stop is located between the two meniscus elements.

11. The projection lens of claim 2 or 3 wherein the projection lens has a long conjugate, a short conjugate, an object side associated with the short conjugate, and an image side associated with the long conjugate and the two meniscus elements are on the image side of the projection lens and the color-correcting doublet is on the object side of the projection lens.

12. The projection lens of claim 2 or 3 wherein the projection lens has a long conjugate, a short conjugate, an object side associated with the short conjugate, and an image side associated with the long conjugate and the two meniscus elements are on the object side of the projection lens and the color-correcting doublet is on the image side of the projection lens.

13. The projection lens of claim 1, 2, or 3 wherein the color-correcting doublet is closely spaced to the two meniscus elements.

14. The projection lens of claim 1 further comprising a corrector lens element which (i) has at least one aspherical surface, (ii) is of weak optical power, and (iii) is located on the object side of the projection lens.

15. The projection lens of claim 14 or 3 wherein the corrector lens element has two aspherical surfaces.

16. The projection lens of claim 14 or 3 wherein the corrector lens element is closely spaced to the two meniscus elements.

17. The projection lens of claim 14 or 3 wherein $f_1$ and $f_2$ have the same sign, the corrector lens element has a focal length $f_{CR}$, and the sign of $f_{CR}$ is opposite to the sign of $f_1$ and $f_2$.

* * * * *